United States Patent Office 2,982,657
Patented May 2, 1961

2,982,657
METHOD OF PRODUCING A WELL-KEEPING VEGETABLE JUICE

Fritz-Günther Keitel, Biedermanplatz 8, Hamburg 21, Germany

No Drawing. Filed June 27, 1957, Ser. No. 668,311

13 Claims. (Cl. 99—155)

It is a known fact that raw juices out of root-crops and vegetables, such as common beets, carrots, celery and so forth, will keep for a short time only; at room temperature a change sets in already after 6 hours, which makes them unpalatable and destroys their valuable vitamins. These changes substantially depend on the fact that the raw material carries a great number of earth bacilli and earth bacteria, which are partly removed in the peeling and washing of the root crops. However, spores and bacteria are still left in such quantities that a rapid and unretarded development of the same will take place in the juices which are so favorable for growth of the same because of their rich contents of vitamins and nutritive substances, a decomposition of the substratum being thus effected through a metabolic activity increasing from one hour to the other. On the other hand, it has been found in practice that root-crops, for example, may be mixed up so generously with microbes such as *Bacterium coli*, that the raw material is infected not only superficially but in a still higher degree also interiorly, which internal infections may, furthermore, substantially accelerate the detrimental changes of the raw juices to a considerable extent. At refrigerator temperatures these processes are obviously retarded in some measure, but even under such circumstances the juices are no longer palatable after two days, inasmuch as a formation of germs in the spores and an increase of the vegetable cells and bacteria have taken place in spite of the low temperatures involved.

The consumption of such fermented juices may result in disturbances of the intestinal activity and other diseases. Pasteurization of the juices does not bring about any appreciable improvement of the microbic state, inasmuch as the spores are not destroyed while this is the case with the bacteria. Most of the spores are not destroyed even at a temperature of 100° C., which, however, entirely changes the crude character and taste of the juices. Temperatures above 100° C., at which sterilization is certainly obtained, may not be brought into consideration, irrespective of the reason just mentioned, inasmuch as important vitamins are then also destroyed. A condition, however, for the production of vegetables juices is that they keep their crude character as far as possible.

In connection with vegetable juices conditions are similar. These juices are carriers of a multiplex flora of non-desirable microbes, such as spore creators and putrefaction bacteria. For the development of this flora the above statements in connection with root-crops hold true. In the bacteria flora occurring in all chlorophyll-carrying plants there are also, however, a small number of lactic acid bacteria, which under favorable conditions commence to develop after 24-48 hours. However, the lactic acid formed will hardly reach the stage corresponding to the initial fermentation, inasmuch as it is neutralized by buffer substances. However, if it becomes noticeable in the juice by reducing the pH-value, the milieu will be displaced in a direction toward the acid side. The hydrogen ion concentration thus changing is a bar to the development of the detrimental flora. The increasing acid milieu brakes the increase of the metabolic activity and may cause the latter finally to cease at further falling pH-values. However, before the present lactic acid bacteria have reached such a stage, there has been a lively increase of the detrimental flora, so that the juices will then in most cases already be in a state of decomposition. Thus the spontaneous flora of lactic acid bacteria has no influence, or only a limited influence, on the development of the detrimental sprouts or spores during the first 24-48 hours.

Now, it is generally known in bacteriology that spore creators and putrefaction bacteria as indicated above, cannot develop at all or can develop to a very small extent in an acid milieu, the degree of the hydrogen ion concentration then playing a decisive part. The present sprouts are also developed into vegetative cells. If these might possibly increase further through a division of the cells, the further development and the formation of new spores is rendered impossible at further falling pH-values. However, the vegetative cells behave in the same way as do the putrefaction bacteria. They die at low pH-values and are then destroyed by heat already at 60° C. Spores with a commencing germination behave in the same manner even if the process of germination has hardly set in. The spores have thus lost their heat resistivity.

*Bacterium coli*, which is known as an acid creator and putrefaction bacterium, is also subjected to the conditions set forth above. They are retarded in their development at an increasing hydrogen ion concentration, their metabolic activity is finally suppressed, and they are killed through the influence of heat already at relatively low temperatures.

Now, the present invention has for its object by a lactic acid fermentation process, proceeding rapidly according to the circumstances, to retard the development of putrefaction bacteria, to promote a development of the sprouts of the spores, to prevent the growth of the vegetative cells by a suitable hydrogen ion concentration, to suppress a new formation of spores and by a subsequent pasteurization at a low temperature to make the juices well-keeping or even sterile.

To bring about a change of the hydrogen ion concentration one might of course use admixtures of palatable organic acids to evade fermentation. It has been found, however, that with a sudden fall of the pH-value the spores do not develop but remain lying inactive and pass through the pasteurization in an uninjured condition. Furthermore, the juices in this way obtain a flat and nauseous taste that acts detrimentally on the palatableness of the juice in consideration. Also, in certain reform quarters, which are the greatest consumers of such juices, no admixtures of organic acids are tolerated, which are mostly of a synthetic origin. However, the use of natural acids would involve a considerable increase of the price of the juices, without the percentage of the spores and the taste permitting of any improvement thereby.

The procedure for the preparation of vegetable juices was usually so that the raw-pressed juices were subjected to a repeated pasteurization (so-called tyndallization) or that already the raw material (carrots, celery, beet roots, etc.) was heated, that is, stewed and the juice of these no longer raw vegetables was subjected to the heat treatment mentioned. When using such methods, it is not possible, owing to purely bacteriological reasons, to sterilize the products; left-over spores germinate, and the juices may be transformed into badly smelling, rotten liquids. It may, however, also happen that the juices treated in this manner, are in a condition that the changes are not yet perceptible, since the micro-organisms are in a state where they begin to become virulent. The consumption of such products may cause serious diseases. The risks in the fractionated sterilization (tyndallization) by which unhealthy micro-organisms are not completely destroyed, are much too great as to use this method for the preparation of the physiologicaly and therapeutically important vegetable juices at all.

If also now and then experiments have been made to treat the raw material or the material in general with acids, which will be dealt with below, such methods in no way serve the purpose since a material must not only be acidified, but also be fermented. By this method the spores are not destroyed.

However, if the juices are subjected to a heating under pressure of, e.g. 120° C., as it has already been done, sterilized products are obtained, but the biological quality is entirely destroyed, as it is also the case in the tyndallization process. The taste and smell of such juices are not tempting. These products are no longer vegetable juices, but only conglomerates of their chemical compounds.

It is also already known to sterilize the juices and to ferment them subsequently, in order to produce lactic acid; in this method, in the case of fruit juices, i.e. acid juices, the same have been neutralized beforehand. However, by means of such methods at best lemonades, but never biological vegetable juices can be obtained, whose original quality is to be retained.

According to the findings by the inventor this may be achieved by lactic acid fermentation, i.e. by the biological preservation of the entirely untreated raw juices, since the lactic acid fermentation causes a stability of the ratio of the substances and the biological potency, by which the disadvantageous changes can no longer occur. The lactic acid fermentation, on the one hand, acts as stabilizer of the milieu, and, on the other hand, constitutes a biological filter through which noxious spores—e.g. in periods of epidemics—cannot enter. Moreover, vegetable juices treated according to the present invention never have the taste of having been boiled, as it is often the case with products on the market.

It is consequently the object of the present invention to hold up the development of the putrefactive bacteria by a quick lactic acid fermentation, to bring about a germination of the spores, to prevent the growth of vegetative cells by a suitable hydrogen ions concentration, to prevent a new spore formation and to preserve and even sterilize the juices by subsequent low-pasteurization.

The culture is cultivated in a malt mash (according to the Swedish Patent No. 132,701) at a temperature between 32 and 45° C., preferably 35° to 38° C. The mash is caused to ferment for about 3 days, whereupon the bacteria content of the culture is to amount to many hundred milliards. This also holds true with the use of other lactic acid bacteria with different temperature ranges. At a ½–1% inoculation of the juice tempered to 35–38° C., the fermentation would accordingly set in at, for instance, 50 millions of powerfully fermentation-virulent lactic acid bacteria per cubic centimeter of juice, a content of bacteria which is sufficient to lower the pH-value to 5.0 already in a few hours, and after approximately 10–12 hours, perhaps even earlier, the fermentation can be interrupted at a pH-value of about 4.2–3.8.

To obtain a rapid fermentation at all, the bacteria, such as the vegetable lactic acid bacteria made use of, require temperatures approaching the maximum limits, the metabolic activity being then appreciably accelerated so as to form large quantities of lactic acid in a short time. For these conditions, large inoculation quantities are required, inasmuch as the highest temperatures made use of certainly accelerate the metabolism, but also reduce the cell division to a certain extent.

Through this type of rapid fermentation, a noticeable development of the spontaneous flora is rendered impossible, which is of an extraordinarily great importance for the quality of the juices.

The cultures used for the inoculation are preferably thoroughly shaken for 1–2 hours prior to the inoculation. The mash is caused to deposit, and only the remaining, yellowish milk-like liquid is used for the inoculation, whereby shell particles from the mash are prevented from getting into the juice.

Inasmuch as the colloids of the juice, which keep the liberated cell constituents suspended, are altered by the lactic acid fermentation, and a precipitation sets in already after a short time, it is found suitable to impart a colloidal structure to the juice by artificial means and to provide the juice with a protective colloid, which can be effected with substances that are neutral from a bacteriological point of view and from the point of view of taste, such a substance being agar-agar, for example. Here, an admixture of, for instance, 1–2 per mille of agar-agar is sufficient, preferably in the form of a liquid 4% water agar, for example.

With stationary quantities of juice, in which fermentation is going on, it frequently happens that small clods are formed at the precipitation, such clods having a detrimental effect on the homogeneous nature of the juice. To avoid this, the juices are preferably fermented in a container provided with a propeller stirring mechanism, whereby the constant movement of the juice prevents the formation of small clods. The homogeneity of the juice is thus influenced favorably.

*Example*

The crude juice produced at great cleanliness and admixed perhaps with crude sugar is rapidly heated, if agar-agar is to be admixed prior to the fermentation, to 40° C., whereupon the necessary quantity of water agar, 1–2 per mille agar-agar, calculated on the quantity of juice, is added. After that, cooling is undertaken to 20° and then heating to 35–38° C., inoculation being effected, for instance, with 1% of the above-named culture. During the agar-treatment, the stirring mechanism has to be operated at approximately 200 revolutions per minute.

If a homogenization is to take place only after the fermentation, the juice is heated immediately on its having been produced to 35–38° C., the inoculation being then also undertaken. After the inoculation, the stirring mechanism is caused to rotate as in the preceding case, but only at 50 revolutions per minute. The temperature is kept constant by means of a thermostat at a temperature between 35 and 38° C., but nearer to 38° C. Inasmuch as the fermentation vessel is to be kept closed during the treatment by means of a cover or the like, carbonic acid is preferably introduced over the juice. After 4 hours the pH value shall have fallen to 5.0, and after 10–12 hours, perhaps in a still lesser time, it shall have fallen to 4.2–3.8. When this hydrogen ion concentration has been reached, the juice is rapidly heated to 60° C., while the stirring mechanism is driven up to 200 revolutions per minute, the liquid water agar solution being then added and cooling being undertaken to 20° C. to cause the agar-agar to coagulate in an extremely finely divided state, whereupon the temperature is again raised to 60° C., at which temperature the juice is filled into bottles. At the filling of the bottles it should be observed that they are preferably to be filled in their entirely, so that no air space is produced when the bottles are closed. The bottles are then pasteurized immediately at 60° for 10 minutes. After that the bottles are cooled down, a vacuum being thus produced, which aids toward the keeping capacity of the juice. It is advisable to take a few bottles from every batch and to retain them for 8 days at 35–38° C. in order to test their keeping capacity in this way.

It has been found that juices produced in this manner, such as carrot juice, have an unlimited keeping capacity, and that their quality is even improved in storing, as is the case with wine. For example, carrot juice showed an extraordinarily agreeable, thirst-quenching, refreshing and aromatic taste, without having lost its basic character of carrot juice. The taste found by many people to be repellent and somewhat nauseous, had disappeared, and the juice had rather acquired the property of a refreshing drink.

Inasmuch as the cell substances of the lactic acid bacteria remain in the juice, no reduction of the vitamin content will set in, particularly not of the content of B-vitamin, through the fermentation. The carotin percentage of the carrot juice amounted to 4.6–4.8 milligrams per 100 cubic centimeters of juice.

This method of biological juice preservation is particularly applicable to such vegetable juices which are made from root-crops, such as carrots, celery, common beets, vegetabilia, stinging nettles, and so forth. Here, due regard will often have to be takn to the fact that juices of vegetabilia with quantities of sugar that cannot be established from the point of view of taste should be admixed, prior to the fermentation, with so much sugar, for instance 3%, that the juice has a noticeably sweet taste. Here, vegetabilia are also understood to comprise such species as tomatoes and cucumbers that have a lower percentage of acid than is generally the case with fruits.

If the juices are to be enriched with vitamins, such as B- and C-vitamins, it is advisable prior to the pasteurization to admix the juice with black currants and the like, for example, as well as with yeast. It is true that such juices lose somewhat of their basic character, but they can still be sold under the designation natural genuine vitamin juices.

The crude juices present in the market already now were, if chemical preserving agents had not been brought into use, such use being not accepted by certain reform quarters which are the main consumers of these products, exceedingly difficult to distribute on account of their inferior keeping capacity. Thus, these crude juices could hitherto be sold only when ordered, and generally they are not available at all in the months May, June, July and August. Carrot juice to be sold in the mornings, for example, will have to be produced early in the morning, and juices that are to reach the customers in the afternoon, will have to be produced during the morning, that is to say, only a few hours prior to being consumed. Goods that are not sold the same day become valueless the day after.

Therefore, the production of crude juices according to the present method brings an extraordinarily great improvement in the first place of the juices as such, and, secondly, with respect to the distribution. Furthermore, this method involves an appreciable reduction of the price of the products. The stores may keep large quantities of such juices, and the customers need not buy their carrot juice every day, but may cover, for instance, what is required for a week or a month at the same time.

Furthermore, these juices are of great medical importance, inasmuch as the lactic acid bacteria, such as the vegetable lactic acid bacteria, fermented with the juices form, in addition to the physiologically important lactic acid, metabolic products having a very advantageous influence on the intestinal system.

I wish it to be understood that I do not intend to be limited to the details of the method described, as numerous modifications within the scope of the following claims and involving no departure from the spirit of the invention nor any sacrifice of the advantages thereof, are likely to occur to workers in this field.

I claim:

1. The method of producing a well-keeping vegetable juice which comprises first subjecting fresh crude vegetable juice having a pH above 4.0 to fermentation with lactic acid producing bacteria at an elevated temperature and for a period of not more than about twelve hours, until such a quantity of lactic acid is formed that the thus fermented juice has a pH between about 3.8 and 4.2, and then pasteurizing said juice, the fermentation being carried out in the presence of agar-agar as a neutral protective colloid.

2. The method of producing a well-keeping vegetable juice which comprises first subjecting fresh crude vegetable juice having a pH above 4.0 to fermentation with a lactic acid producing bacteria occurring on green parts of plants at a temperature of 32 to 45° C. for a period of about 10 to 12 hours until such a quantity of lactic acid is formed that the thus fermented juice has a pH between about 3.8 and 4.2 and then pasteurizing said juice.

3. The method of producing a well-keeping vegetable juice which comprises first subjecting fresh crude vegetable juice having a pH above 4.0 to fermentation with a lactic acid producing bacteria at a temperature of 32 to 45° C. for a period of about 10 to 12 hours and in the presence of a neutral protective colloid until such a quantity of lactic acid is formed that the thus fermented juice has a pH between about 3.8 and 4.2 and then pasteurizing said juice.

4. The method of claim 3 wherein said colloid is added in the form of a boiled aqueous batch.

5. The method of claim 4 wherein said colloid consists of agar-agar.

6. The method of producing a well-keeping vegetable juice which retains natural flavor and vitamins which comprises subjecting fresh crude vegetable juice having a pH greater than about 4.0 to 4.2 to fermentation with lactic acid producing bacteria at a temperature of 32 to 45° C. for a period of not greater than about 24 hours and until the number of spores in said juice has been reduced substantially to zero by germination and until such a quantity of lactic acid has formed that the fermented juice has a pH between about 3.8 and 4.2 and then pasteurizing said juice without substantially reducing the natural flavor thereof.

7. The method of claim 6 in which said fermentation is carried out for a period of about 10 to 12 hours.

8. The method of claim 6 in which said fermentation is carried out at a temperature of between about 35 and 38° C.

9. The method of claim 6 in which said pasteurization comprises heating said juice at a temperature between about 55 and 60° C.

10. The method of claim 6 in which the vegetable juice is fermented by inoculation with ½ to 1% of a lactic acid bacteria preparation containing 50 to 500 milliards of bacteria per cubic centimeter.

11. The method of producing a well-keeping vegetable juice which retains natural flavor and vitamins which comprises subjecting the fresh crude juice of a vegetable selected from the class consisting of root crops and tomatoes having a pH greater than about 4.0 to 4.2 to fermentation with vegetable lactic acid producing bacteria at a temperature of 32 to 45° C. for a period of not greater than about 24 hours and until the number of spores in said juice has been reduced substantially to zero by germination and until such a quantity of lactic acid has formed that the fermented juice has a pH between about 3.8 and 4.2 and then pasteurizing said juice without substantially reducing the natural flavor thereof.

12. The method of claim 11 in which said pasteurization comprises heating said juice at a temperature between about 55 and 60° C.

13. The method of claim 11 in which said fermentation is carried out for a period of about 10 to 12 hours.

References Cited in the file of this patent

UNITED STATES PATENTS

| | | |
|---|---|---|
| 1,204,869 | Heuser | Nov. 14, 1916 |
| 1,249,259 | Wahl | Dec. 4, 1917 |
| 1,461,808 | Snelling | July 17, 1923 |